United States Patent
Oriol et al.

(10) Patent No.: US 10,055,009 B2
(45) Date of Patent: Aug. 21, 2018

(54) DYNAMIC DISPLAY REFRESH RATE BASED ON DEVICE MOTION

(71) Applicant: Apple Inc., Cupertino, CA (US)

(72) Inventors: Timothy R. Oriol, Cupertino, CA (US);
Norman N. Wang, San Jose, CA (US);
Domenico P. Porcino, Novato, CA (US); Jacques P. Gasselin de Richebourg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/291,464

(22) Filed: May 30, 2014

(65) Prior Publication Data
US 2015/0348511 A1    Dec. 3, 2015

(51) Int. Cl.
| | |
|---|---|
| *H04N 5/228* | (2006.01) |
| *G06F 3/01* | (2006.01) |
| *H04N 5/232* | (2006.01) |
| *G09G 5/00* | (2006.01) |

(52) U.S. Cl.
CPC ............... *G06F 3/01* (2013.01); *G09G 5/003* (2013.01); *H04N 5/23241* (2013.01); *G09G 2320/0261* (2013.01); *G09G 2320/103* (2013.01); *G09G 2330/021* (2013.01); *G09G 2330/022* (2013.01); *G09G 2340/0435* (2013.01); *G09G 2356/00* (2013.01)

(58) Field of Classification Search
CPC ............ H04N 5/228; H04N 7/18; H04N 9/09; H04N 5/23241; G03B 5/00; G09G 3/3611; G06F 1/1694; G06Q 30/0277; G06T 7/20

USPC ............ 345/212; 348/208.16, 142, 262, 441, 348/660, 208.4; 705/14.16
See application file for complete search history.

(56) References Cited

U.S. PATENT DOCUMENTS

| | | | |
|---|---|---|---|
| 2009/0184849 | A1 | 7/2009 | Nasiri |
| 2011/0199318 | A1 | 8/2011 | Fong |
| 2011/0234826 | A1* | 9/2011 | Nguyen ................... G03B 5/00 348/208.6 |
| 2012/0120264 | A1* | 5/2012 | Lee ......................... G06T 7/20 348/208.4 |
| 2012/0223884 | A1 | 9/2012 | Bi |
| 2012/0262592 | A1* | 10/2012 | Rabii ...................... 348/208.16 |
| 2013/0018714 | A1* | 1/2013 | George ............. G06Q 30/0277 705/14.16 |
| 2013/0242187 | A1* | 9/2013 | Noda .................. G09G 3/3611 348/441 |

(Continued)

FOREIGN PATENT DOCUMENTS

GB     2378878 B     5/2005

*Primary Examiner* — Abdul-Samad A Adediran
(74) *Attorney, Agent, or Firm* — Blank Rome LLP (57) ABSTRACT

The refresh rate of a display of a portable display device is dependent on the degree of device motion detected by one or more motion sensors included in the portable display device, according to an embodiment of the invention. In an embodiment, when no device motion is detected by the one or more sensors, the display of the portable display device is refreshed at an initial refresh rate. When the one or more motion sensors detects a degree of device motion above a motion threshold, the refresh rate of the display is decreased to a motion-based refresh rate, according to an embodiment. In an embodiment, the degree of motion of moving content on the display is also taken into account when determining the display refresh rate.

20 Claims, 8 Drawing Sheets

(56) References Cited

U.S. PATENT DOCUMENTS

| | | | |
|---|---|---|---|
| 2013/0335562 A1* | 12/2013 | Ramanandan | G06T 7/2053 |
| | | | 348/142 |
| 2014/0111550 A1* | 4/2014 | Abraham | G06F 1/1694 |
| | | | 345/660 |
| 2015/0229889 A1* | 8/2015 | Boettiger | H04N 9/09 |
| | | | 348/262 |

* cited by examiner

DYNAMIC DISPLAY REFRESH RATE BASED ON DEVICE MOTION

BACKGROUND

This disclosure relates generally to the field of portable computing devices and, more particularly, to various techniques for managing power consumption by adjusting the graphics display rate in response to device motion.

The advancement of portable computing devices requires increased performance across all components, including central processing, graphics processing, display hardware, and wireless communication interfaces. Increased performance typically comes at a cost of increased power consumption. Certain intensive graphics applications such as games and streaming video can be especially taxing on power consumption. As such, any opportunities to reduce power consumption without losses in device performance are valuable.

SUMMARY

When a portable display device is in motion, the viewer perception of the display is reduced. For example, a viewer of a moving, jostling display may see reduced detail of displayed content, and may not distinguish smooth motion in animations. In such situations, battery power spent refreshing the display screen at a high rate that enables display performance at or near the highest capabilities of the display is effectively wasted. Battery and processing power used to model and render new or additional frames for display may also be wasted.

In one embodiment, a device, method, and computer readable medium for implementing a dynamic display refresh rate based on motion of a portable display device is disclosed. The refresh rate of a display of a portable display device is dependent on the degree of device motion detected by one or more motion sensors included in the portable display device, according to one embodiment. In one embodiment, when no device motion is detected by the one or more sensors, the display of the portable display device may be refreshed at an initial refresh rate. When the one or more motion sensors detects a degree of device motion above a motion threshold, the refresh rate of the display may be decreased to a motion-based refresh rate. In another embodiment, the degree of motion of moving content on the display may also be taken into account when determining the display refresh rate. Content motion may be determined based on, for example, instructions received by the graphics system, models generated by the graphics system, or frames rendered by the graphics system.

In another embodiment, the rendering rate of the portable display device's graphics system may be adjusted based on detected device motion. For example, the rate at which the graphics system renders new frames may decrease in response to detected increases in device motion. In yet another embodiment, the modeling rate of the portable display device's graphics system is determined based on device motion. The motion of moving content on the display may also be taken into account when determining the modeling and/or rendering rate.

Reduction of any of the modeling rate, rendering rate, and the refresh rate of the portable display device may result in jerky motion or loss of detail in displayed content. However, because the viewer perception of displayed content is already reduced by the motion of the display, reduction of the modeling rate, rendering rate, or refresh rate—either alone or in combination—may not significantly further impact viewer perception of the moving device. As such, battery power can be conserved with minimal impact to the viewing experience of the device user.

DETAILED DESCRIPTION

This disclosure pertains to systems, methods, and computer readable media for a portable display device. At least one of the modeling rate, the rendering rate, and the display refresh rate is dependent on the device motion detected by one or more motion sensors included in the portable display device, according to one embodiment. In one embodiment, when no device motion is detected by the one or more sensors, the display of the portable display device may be refreshed at an initial refresh rate. When the one or more motion sensors detects a degree of device motion above a motion threshold, the refresh rate of the display may be decreased to a motion-based refresh rate. In another embodiment, the degree of motion of moving content on the display may also be taken into account when determining the display refresh rate. The rates at which the graphics system models content and renders frames may also be reduced in response to increased device movement, alone or in combination with the display refresh rate. Reducing the modeling rate, rendering rate, and display refresh rate may result in jerky motion or loss of detail in displayed content. However, because motion has already reduced viewer perception of content on the portable display device, viewer perception may not be significantly further impacted. As such, battery power can be conserved with minimal impact to the viewing experience of the device user. The techniques disclosed herein are applicable to any number of portable electronic devices with displays, such as digital cameras, digital video cameras, mobile phones, personal data assistants (PDAs), portable music players, monitors, televisions, laptops, tablet displays and wearable electronics, such as watches and glasses.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed embodiments. In the interest of clarity, not all features of an actual implementation are described in this specification. Moreover, the language used in this disclosure has been principally selected for readability and instructional purposes, and may not have been selected to delineate or circumscribe the inventive subject matter; rather, the claim language determines such inventive subject matter. Reference in this disclosure to "one embodiment" or to "an embodiment" means that a particular feature, structure, or characteristic described in connection with the embodiment is included in at least one implementation of the disclosed subject matter, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

In one aspect of the invention, power consumption of a portable display device is reduced by reducing at least one of the modeling rate, the rendering rate, and the display refresh rate when the device is in motion. The ability of a viewer of a display to distinguish displayed content is reduced when the display is moving, especially when the displayed content is also moving within the display. At such times, any power expended to generate a graphic model, render a frame, or refresh the display is in a sense wasted, as it generates changes in content that are likely indistinguishable by the viewer. By reducing the rate at which content is modeled, rendered, and/or refreshed on the display when device motion is sensed, the device's battery life may be extended without meaningfully or significantly impacting the experience of the viewer.

For example, the viewer may be a jogger, and in an embodiment the portable display device is a mobile phone. When the viewer is standing still, such as when reviewing a running route on the mobile phone's display prior to beginning a run, the viewer has a high degree of perception of the content on the display. The viewer can distinguish high detail of displayed graphical objects, and smooth motion of animated displayed content. At this point, the phone experiences a low degree of motion and its display may be refreshed at an initially high refresh rate. As used herein, the phrase "refresh rate of a display" refers to the number of times in a given time period (e.g., a second) that the display image is updated by the display controller. The initial refresh rate may be at or near the maximum refresh rate of which the display system is capable. In an embodiment, the initial refresh rate enables visual performance—e.g., smoothness of motion—near the maximum capabilities of the display system in accordance with the high degree of perception of the viewer.

When the viewer beings to jog, she may hold the phone in her hand and refer to it, for example, for route guidance, workout updates, or to control a music application on the phone. Due to the viewer's movement and the jostling and swinging of her hands as she jogs, her perceptual sensitivity to the display may be reduced. In an embodiment of the invention, the phone includes one or more motion sensors capable of detecting various aspects of the phone's movement. When a degree of motion above a threshold is detected, the initial refresh rate of the display may be reduced to one of one or more motion-based refresh rates.

A reduced refresh rate may result in decreased detail, jerky motion, and overall lower visual performance of the display. However, because the perceptual sensitivity of the viewer is also reduced by the motion of her phone, her visual experience may not be meaningfully impacted by any potential reduction in display quality. At the same time, the reduced refresh rate decreases power load of the display system, potentially resulting in increased battery life of the portable display device. Note that the content to be displayed and the rate at which such content is generated will not necessarily be affected by changes in the refresh rate of the display.

Though the portable display device in this example is a mobile phone, the disclosed methods and systems are applicable to virtually any device having a display that is capable of motion and that is refreshed at a refresh rate. For example, in addition to mobile phones, other handheld display devices include tablets, digital media players, cameras, e-book readers, video game controllers, and handheld video games. The portable display device may also include wearable devices such as watches, glasses, and cameras. Other portable display devices may be fixed or incorporated into moving vehicles, such as navigation devices and cameras.

Figure 1:
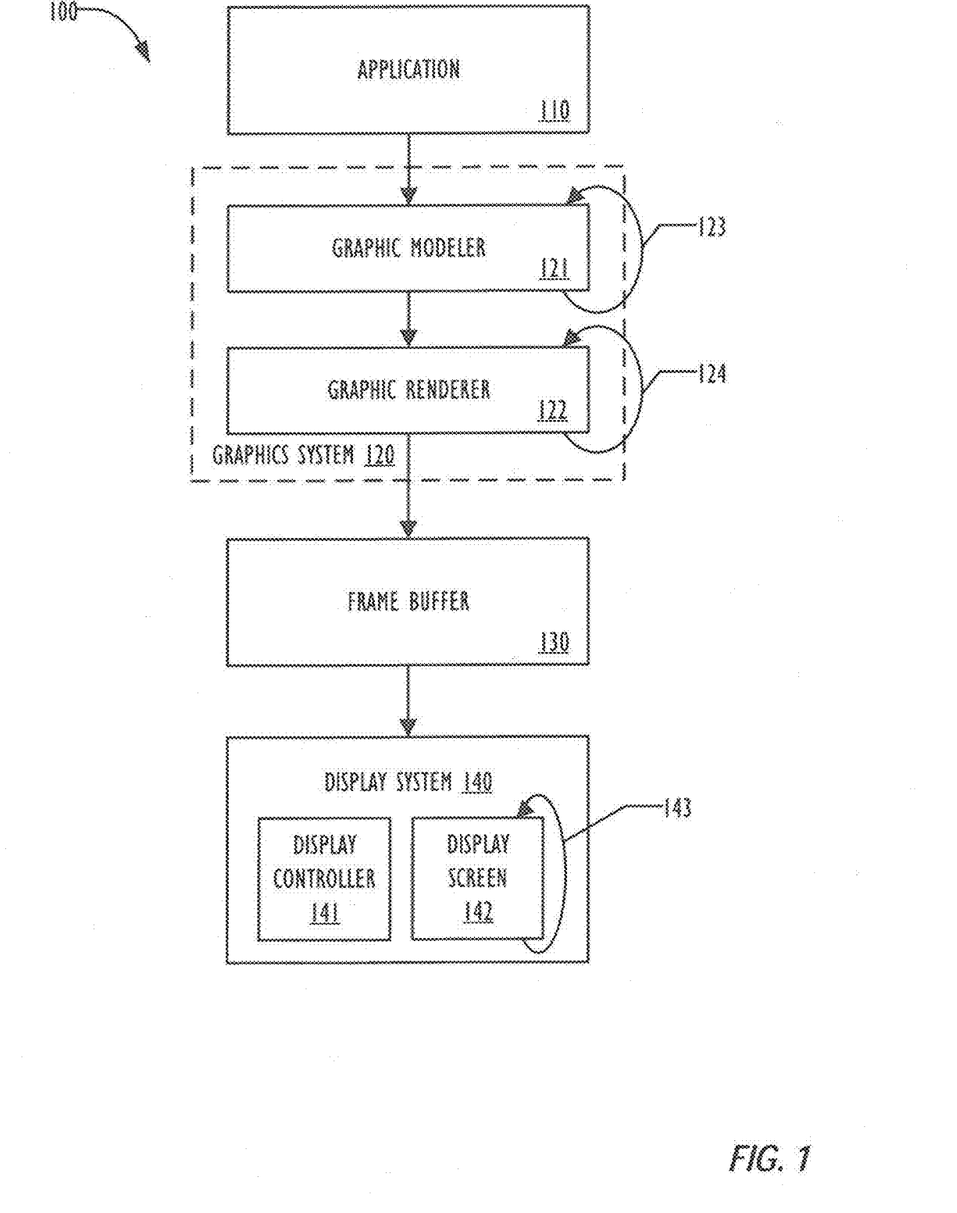
FIG. 1 illustrates a graphics pipeline, according to one embodiment.

FIG. 1 illustrates a high-level graphics pipeline 100 of a portable display device, according to one embodiment. An application 110 includes instructions for generating graphic content to be displayed on a display. In one embodiment, instructions from the application 110 are sent to the graphics system 120. Graphics system 120 generates rendered frames, which are sent to a frame buffer 130. Display content is read from frame buffer 130 by the display system 140 for display on display screen 142.

In one embodiment, application 110 includes executable instructions stored in durable memory. By way of example, application 110 may be an "app" to be executed by the processor of the portable display device. In another embodiment, application 110 may be a feature of the operating system for the portable display device.

Graphics system 120 uses the instructions from application 110 to render content, according to one embodiment. In one embodiment, graphics system 120 includes a graphic modeler 121 and graphic renderer 122. Graphic modeler 121 generates a graphic model based on the instructions from application 110. The graphic model may be, for example, a 3D model. In one embodiment, the graphic modeler 121 updates the graphic model at a modeling rate 123. Next, graphic renderer 122 renders a frame based on the graphic modeler 121. The rendered frame may be a 2D projection of the 3D model from a particular perspective. In one embodiment, the graphic renderer 122 generates a new frame at the frame rate 124. The frame rate 124 may also be known as the rendering rate. In one embodiment, graphics system 120 includes one or more graphics processing units (GPUs). In another embodiment, rendering is performed by both a central processing unit (CPU) and a GPU.

Content rendered by graphics system 120 may be stored, frame by frame, in frame buffer 130. In an embodiment, frames are stored in the frame buffer 130 at the time they are rendered by the graphics system 120. In another embodiment, rendered frames are stored in the frame buffer 130 only when space for the frame is available in the frame buffer 130, e.g., after a frame has been displayed on the display system 140.

According to one embodiment, display system 140 includes a display screen 142 for displaying content, and a display controller 141 for controlling the display screen 142. Display screen 142 may be any type of display that is refreshed, such as cathode ray tube (CRT), paper-white, organic light emitting diode (OLED), liquid crystal display (LCD), or light emitting diode (LED). In an embodiment, display screen 142 may be refreshed at refresh rate 143. In an embodiment, display controller 141 takes a rendered frame from the frame buffer 130 for display on display screen 142.

In general, the faster that moving content is generated and updated on a display, the higher the visual quality will be. Higher rates of changed content on a screen enable smoother movement. In general, the rate at which content is updated on a screen is limited by the slower of the frame rate and the refresh rate. If the refresh rate exceeds the frame rate, then a rendered frame will be displayed more than once, and visual motion quality will be limited to no faster than the frame rate. If the frame rate exceeds the refresh rate, then unviewed frames may be overwritten in the frame buffer by newly rendered frames before being displayed, and visual motion quality can be limited to no faster than the refresh rate. Similarly, the rate at which the graphic model on which rendering is based is updated will impact the visual quality of moving graphics. As such, the highest quality visual motion requires a high modeling rate, high frame rate and high refresh rate.

In one embodiment, the frame rate 124 and refresh rate 143 are independent. That is, the refresh rate 143 may exceed, equal, or be less than the frame rate 124. In an embodiment, the rate at which content is generated is independent of the display refresh rate 143. In another embodiment, the frame rate 124 and refresh rate 143 are synchronized.

FIG. 1 illustrates only one embodiment of a variety of graphics rendering pipeline strategies for rendering content on a display. On a portable display device capable of sensing motion, any graphics pipeline supplying rendered content to a display updating at a refresh rate may implement various aspects of the disclosed subject matter.

Figure 2:
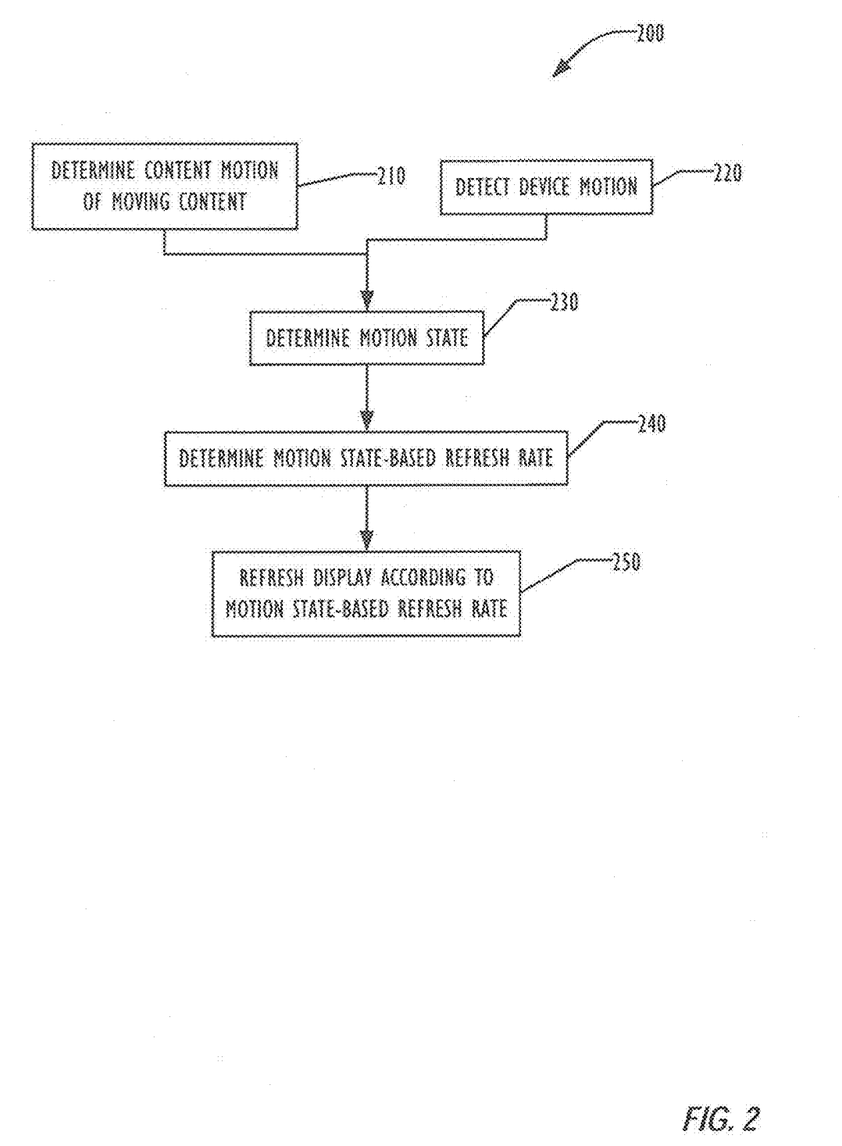
FIG. 2 is a flowchart illustrating a method for implementing a dynamic display refresh rate based on device motion, according to one embodiment.

FIG. 2 is a flowchart 200 illustrating a method for refreshing a display at a dynamic display refresh rate based on device motion, according to one embodiment. In the illustrated embodiment, both the displayed content's motion on the display and the motion of the portable display device inform the determination of the display refresh rate. Though the movement of the display alone may impact viewer perception, it is the degree of movement of the content on the display with respect to the global context that affects the viewer's perception of that content. As such, the movement of displayed content within the viewer's context may be used to determine whether viewer perception of the moving content is reduced. If the combined motion reaches a level where viewer perception may be affected, the refresh rate of the display may be reduced without significantly affecting the viewer experience or perception of the displayed content.

In block 210, the degree of content motion is determined, according to one embodiment. The degree of content motion may be measured in one or more of a variety of formats. For example, the content motion may be measured as a speed, velocity, acceleration, or orientation. In one embodiment, the content's rate of movement may be known. For example, instructions received by the graphics system may include a speed or acceleration for associated content. In another embodiment, the content motion can be calculated from information in the graphics pipeline/rendering flow. For example, content motion may be calculated based on a graphic model or on a graphic rendering generated by the graphics system.

Figure 3:
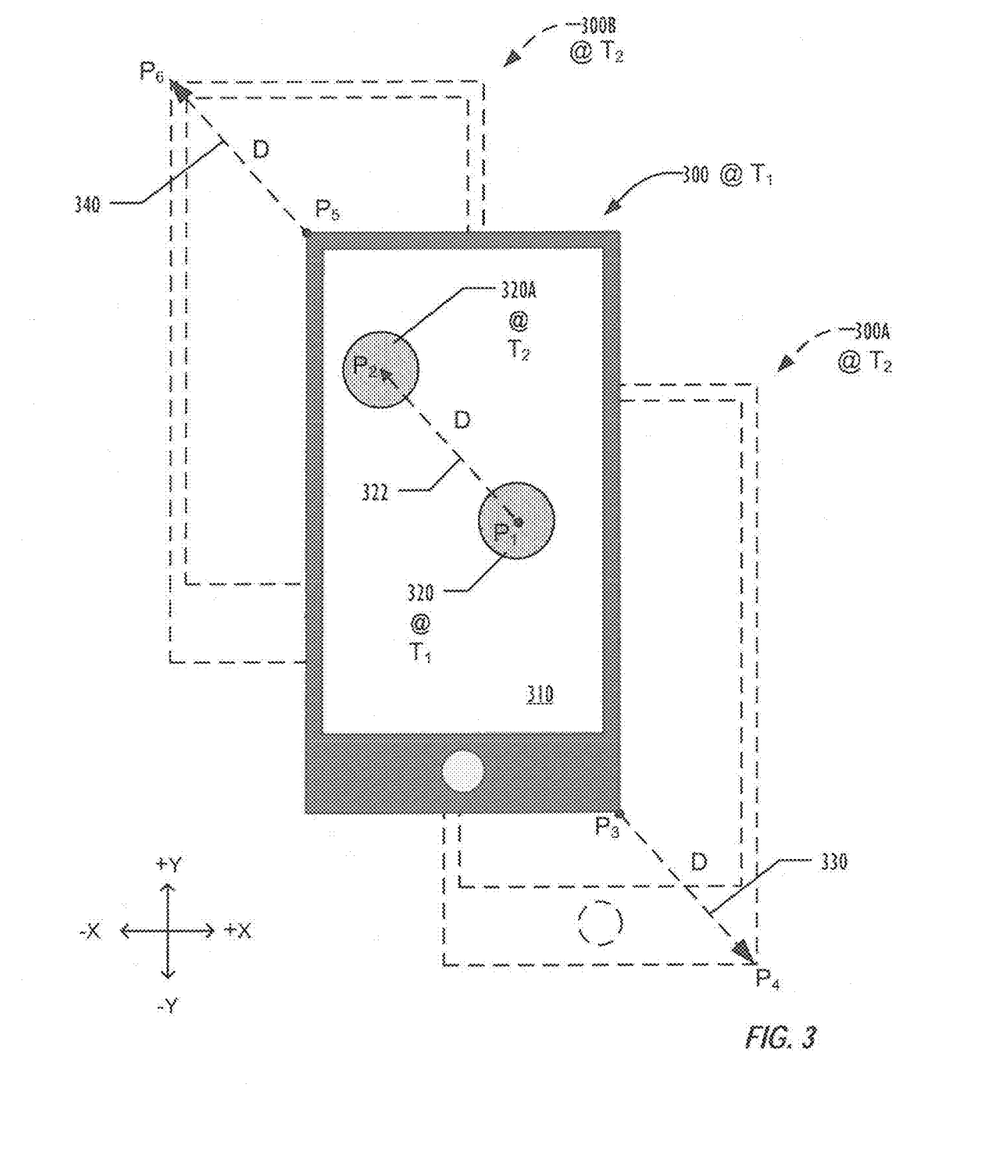
FIG. 3 illustrates a portable display device having a dynamic display refresh rate based on a combination of device motion and content motion, according to one embodiment.

FIG. 3 illustrates one means to calculate the displayed content's rate of movement according to one embodiment. For illustrative purposes, the exemplary determination is described based on displayed content. It is to be understood, however, that the determination of a degree of content motion may be based on information from instructions to the graphics system, modeled graphics, or rendered frames as opposed to, or in combination with, displayed frames.

As illustrated, at time $T_1$ graphical object 320 is located at point $P_1$ on display 310 of portable display device 300, according to one embodiment. At time $T_2$, the graphical object, now designated 320A, has moved to point $P_2$ along trajectory 322. As such, graphical object 320 has moved a distance D. It should be understood that while FIG. 3 illustrates the trajectory of object 320 as being linear, it need not be. The trajectory of motion can be non-linear, including curves. In such a case, the distance D may be measured along the trajectory for the time period from $T_1$ to $T_2$. To calculate the rate of movement of graphical object 320, the distance of movement D can be divided by the time for movement, $(T_2-T_1)$. In an embodiment, the direction of movement (-x, +y) is also noted along with the rate of movement. Content motion may also be measured as the acceleration of object 320 over time period $T_1-T_2$, or the rate of change of the orientation of object 320. Content motion may also take into account several aspects of motion simultaneously, such as acceleration and change in orientation.

In addition, display screen 310 may display more than one moving object. In an embodiment, the content motion may be determined based on the fastest moving object. In another embodiment, the content motion may be based on the slowest moving object. In yet another embodiment, the content motion may be based on an average of multiple moving objects.

In block 220, device motion of a portable display device is determined. In an embodiment, device motion is sensed by one or more motion sensors capable of sensing movement of the portable display device. The types of motion sensors may include, for example, an accelerometer, a gyroscope, a compass, Bluetooth triangulation, cellular triangulation, or GPS. In one embodiment, the motion input from the motion sensors enables determination of a motion state. As such, in one embodiment, the portable display device is capable of determining a variety of motion states, such as speed, velocity, acceleration, and changes in device or display orientation. Additionally, the motion sensors may detect that the portable display device is not experiencing any movement. In one embodiment, the display hardware of the portable display device has a dedicated motion sensor.

Referring back to FIG. 3, two example trajectories 330/340 of portable display device 300 are illustrated according to one embodiment. As illustrated, device 300 moves along first trajectory 330 from point $P_3$ at time $T_1$ to point $P_4$ at time $T_2$, a distance D in direction (+x, −y). The second position of device 300 at time $T_2$ according to first trajectory 330 is illustrated as device 300A. As such, device motion along first trajectory 330 may be determined as the rate of movement, $D/(T_2-T_1)$, in direction (+x, −y). In another embodiment, device 300 moves along second trajectory 340 from point $P_5$ at $T_1$ to point $P_6$ at $T_2$, a distance D in direction (−x, +y). The second position of device 300 at time $T_2$ according to the second path is illustrated as device 300B. As such, device motion along the second path may be determined as the rate of movement, $D/(T_2-T_1)$, in direction (−x, +y). Again, though straight, linear trajectories are shown in this embodiment in order to provide a simple explanation, movement need not be confined to such. Furthermore, other aspects of motion may be included in the degree of motion measurement either in addition to or in lieu of the speed and direction, for example, acceleration and/or orientation of the device 300.

In block 230, the motion of the moving content determined in block 210 and the motion of the device determined in block 220 are combined to determine the motion state, according to one embodiment. The combined motion can capture the overall, global motion of the displayed content, according to one embodiment. In another embodiment, combination of the content motion relative to the display with the display motion within a global context determines the movement of the content relative to the viewer. Content motion may be additive or subtractive to device movement. For example, if the displayed content and the device are moving in the same direction, the refresh rate may be reduced even though device motion alone has not reached a motion threshold. Conversely, if content and device are moving in opposite directions, the refresh rate may remain high despite a high rate of device movement, because the content is "moving" below the motion threshold in a global context.

In an embodiment, content motion does not contribute to the motion state. For example, the content may be determined to not be moving. In another example, the method may take only device motion into account, excluding the determination of content motion.

In one embodiment, the combined content motion and device motion may be less than both the content motion and device motion individually. Referring back to FIG. 3, graphical object 320 moves a distance D in direction (−x, +y) over time period $T_1-T_2$, according to one embodiment. Substantially simultaneously device 300 may move a distance D along first trajectory 330 in direction (+x, −y) over time period $T_1-T_2$. As such, when the movement of object 320 is combined with the movement of portable display device 300, the equal distances D in opposite directions (−x, +y) and (+x, −y) result in zero net movement of graphical object 320 in a global context. As such, in an embodiment, though both graphical object 320 and portable display device 300 are moving, the net/combined movement can be zero.

In another embodiment, the combined content motion and device motion can be greater than either of the content and device motion independently. For example, as shown in FIG. 3, portable display device 300B has moved a distance D in direction (−x, +y), as measured along second trajectory 340 from point $P_5$ to point $P_6$, according to an embodiment. As such, when the movement of object 320 on display 310 is combined with the movement of device 300, the net/combined movement may be twice the distance D in time $T_1-T_2$, in the direction (−x, +y).

It is to be understood that in addition to the two scenarios illustrated with respect to FIG. 3, where the combined motion is either greater than or less than each of the device motion and content motion, the combination of the content motion and device motion may also be intermediate between the content motion and the device motion. By combining the motion of the content on the display with the motion of the display itself, the refresh rate may be reduced when the viewer's perception of the displayed content is reduced. The reduction in refresh rate only when motion of displayed content is already impacting viewer perception enables reducing battery consumption without significantly impacting the viewer's experience.

In block 240, a display refresh rate may be determined from the combined motion determined in block 230. In an embodiment where no motion is detected, an initial or default refresh rate may be used. In another embodiment, the initial refresh rate may be at or near the maximum refresh rate for the display. In one embodiment, the initial refresh rate is 30-120 Hz. As the degree of motion associated with the detected motion state of the portable display device increases, the determined display refresh rate may decrease according to one embodiment.

Figure 4:
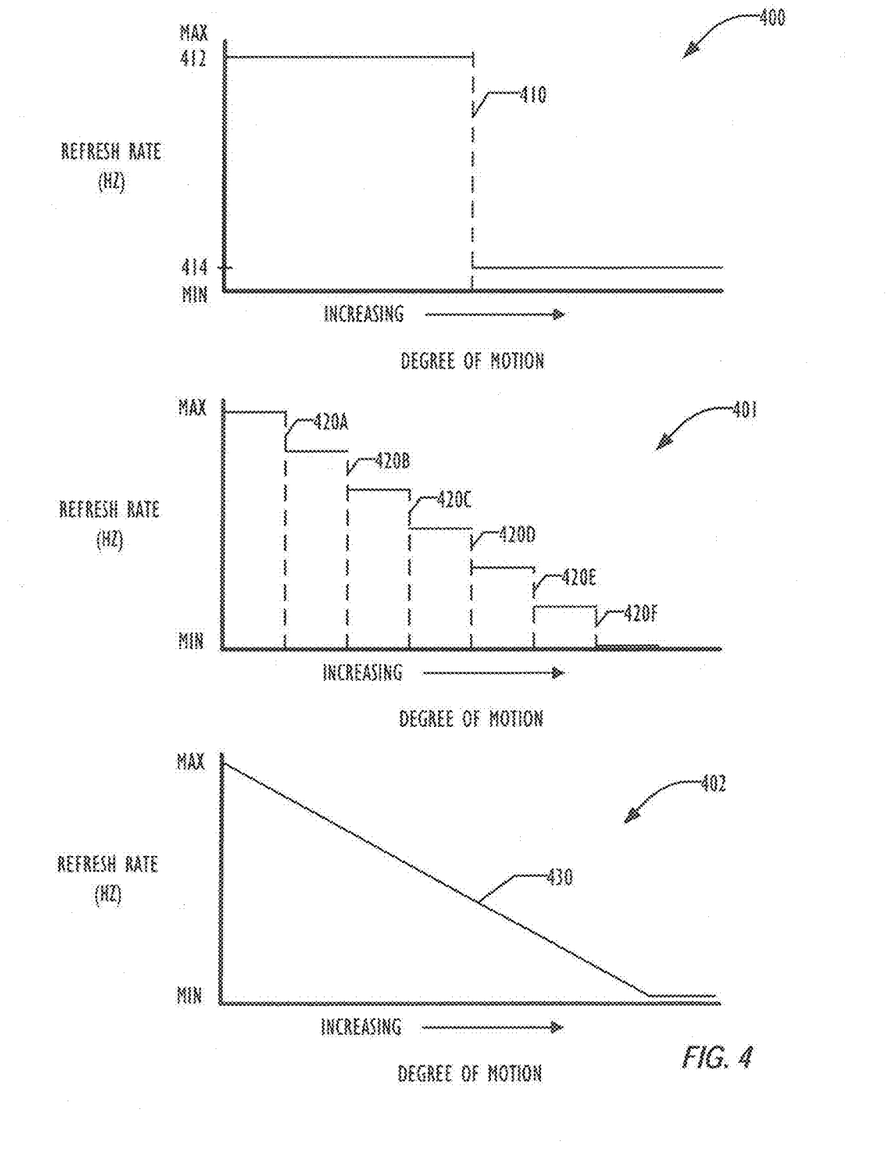
FIG. 4 illustrates the relationship between a degree of device motion and the display refresh rate, according to one embodiment.

FIG. 4 illustrates plots of the relationship between the motion state of a portable display device and the refresh rate of the display, according to various embodiments. Refresh rate is typically measured in frames per second (fps) or Hertz (Hz). The degree of motion may be any suitable measure of motion, for example, speed (e.g., m/s), acceleration (e.g., $m/s^2$) or a rate of rotation (e.g., °/s). The relationship between device motion and refresh rate may be informed by a variety of factors, such as a perceptual model describing how the perception and experience of a display viewer is affected by both motion and refresh rate. The relationship between device motion and refresh rate may additionally be informed by device power concerns, such as the relationship between refresh rate and battery consumption.

Plot 400 illustrates an embodiment where a single motion state threshold 410 is defined. As shown in plot 400, a lower degree of motion is associated with a higher refresh rate. For example, a degree of motion below the motion threshold 410 is associated with normal viewer perception of the device display and, as such, the display is refreshed at an initial refresh rate 412. The initial refresh rate 412 may be at or near the maximum refresh rate of which the display system is capable. In the illustrated embodiment, a higher degree of motion is associated with a reduced refresh rate. Device motion above the threshold 410 is associated with reduced viewer perception of the display. As such, reducing the refresh rate to reduced refresh rate 414 does not significantly impact the visual experience of the viewer. In an embodiment, reduced refresh rate 414 is at or near the minimum refresh rate for the display. In another embodiment, reduced refresh rate 414 is slightly less than the initial refresh rate 412, for example, reduced by 1-5 Hz. In yet another embodiment, reduced refresh rate 414 is 2-8 Hz.

Plot 401 illustrates a discrete relationship between the degree of device motion and display refresh rate according to one embodiment. In such embodiments, the relationship between device motion and refresh rate can include a plurality of motion thresholds 420A-420F, such that as motion increases, the display refresh rate steps down. In an embodiment, motion thresholds 420 are determined based on viewer perception models, so that reduction of the display refresh rate in response to device motion does not significantly impact the viewer experience. Any number of motion thresholds 420 may be defined. In an embodiment, the refresh rate is stepped down at a constant rate per similar increases in degree of motion, as shown in Plot 401. In another embodiment, the intervals between motion thresholds and the degree to which the refresh rate is altered may differ.

Plot 402 illustrates a continuous relationship between a portable display device's motion and the refresh rate of the display, according to one embodiment. In shown in the illustrative embodiment 402, the slope of line 430 is constant. The refresh rate may decrease continuously until a minimum refresh rate is reached. In another embodiment, the slope of line 430 may change. In general, the overall slope of line 430 may be such that the refresh rate decreases as motion increases. In yet another embodiment, the relationship between refresh rate and degree of motion may be defined by a combination of continuous and discrete portions and thresholds. For example, as device motion increases from a minimum amount, the refresh rate may continuously decrease until one or more motion thresholds are reached, at which point the refresh rate may be stepped down discretely until a minimum refresh rate is reached.

Returning again to FIG. 2, in block 250 the display is refreshed according to the determined motion state-based refresh rate. In one embodiment, the process illustrated in flowchart 200 is continuously run such that the motion of the device is continuously monitored and the refresh rate continuously updated based on the sensed motion state. In another embodiment, the method may be run at predetermined intervals. In yet another embodiment, the method may be run on demand, for example, based on an instruction from an application via an application programming interface (API), or as an option within an operating system (OS).

Figure 5:
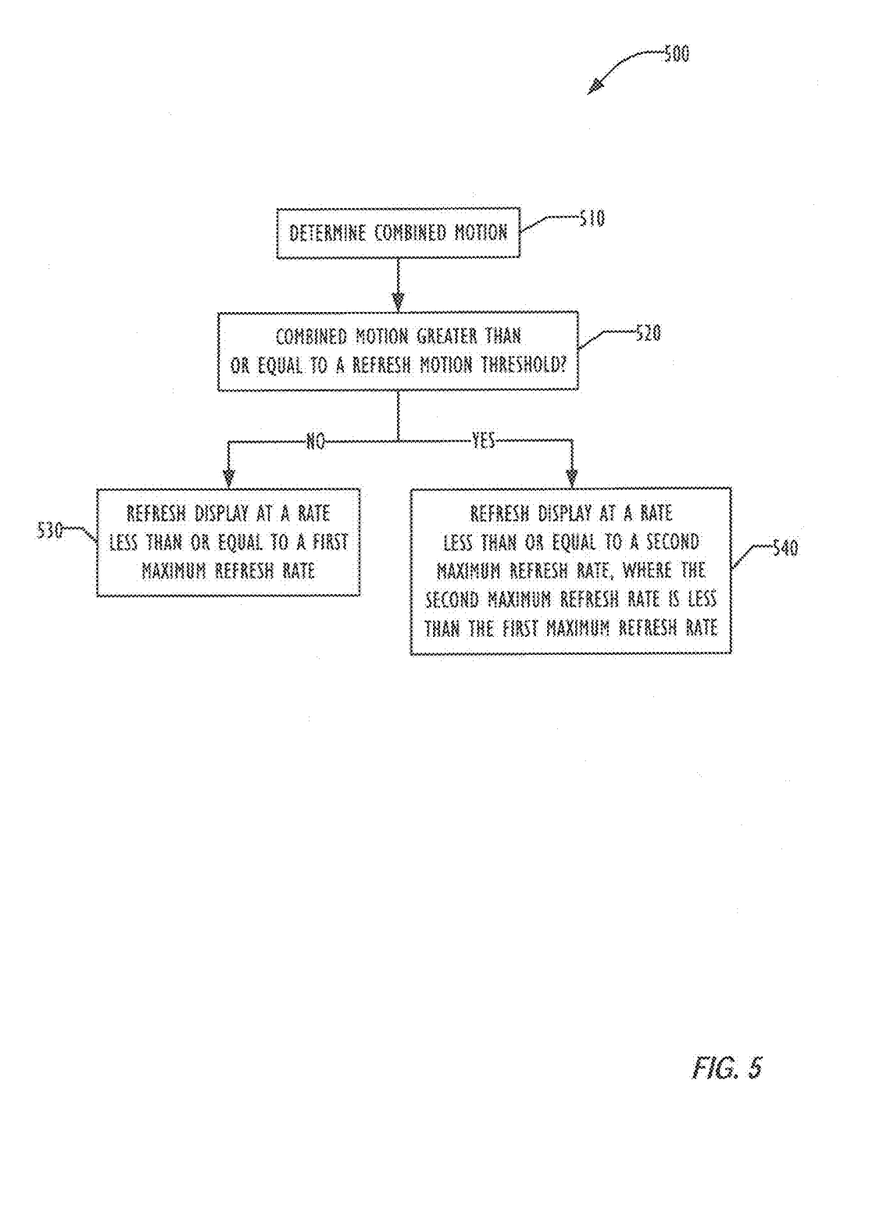
FIG. 5 is a flowchart illustrating a method for implementing a dynamic display refresh rate based on a combination of device motion and content motion, according to one embodiment.

FIG. 5 is a flowchart illustrating a method for dynamically refreshing a display of a portable display device based on device motion, according to an embodiment of the invention. In block 510, the combined motion of displayed content is determined. In one embodiment, content motion and device motion are combined as described above with respect to block 230. In another embodiment, content motion is either zero or excluded, such that only the sensed device motion is used.

In block 520, it is determined whether the combined motion is greater than a refresh motion threshold, according to one embodiment. In one embodiment, the refresh motion threshold may be based on a perceptual model, above which a viewer's perception is reduced as compared to below the motion threshold. In another embodiment, there is a single threshold, as described above with respect to device motion in plot 400 of FIG. 4. In still another embodiment, there is a plurality of refresh motion thresholds (e.g., as illustrated in plot 401 of FIG. 4). In yet another embodiment, there is a continuous relationship between the combined motion and the display refresh rate (e.g., as illustrated in plot 402 of FIG. 4). The refresh threshold(s) may additionally be based on or affiliated with rendering threshold(s) for the frame rate or modeling threshold(s) for the modeling rate.

In block 530, if the combined motion is less than a refresh motion threshold, the display may be refreshed at a rate less than or equal to a first maximum refresh rate. In one embodiment, the first maximum refresh rate may be at or near the maximum refresh rate of which the display is capable. Because the device motion is below the refresh motion threshold, a viewer of the display can perceive a certain level of detail and smoothness of motion in animated or moving content. As such, the first maximum refresh rate enables a higher degree of visual perception. By setting a maximum refresh rate as opposed to a specific refresh rate, the refresh rate of the display may vary based on factors other than device motion (e.g., limits in processing capability), or based on instructions to the display controller, such as those initiated by an application or the operating system.

In block 540, if the combined motion is greater than or equal to a refresh motion threshold, the display may be refreshed at a refresh rate less than or equal to a second maximum refresh rate. In one embodiment, the second maximum refresh rate can be less than the first maximum refresh rate. Again, by setting a second maximum refresh rate as opposed to a specific refresh rate, the refresh rate may be less than as determined by other factors or instructions. However, because in block 530 the device motion is determined to be above a motion threshold where visual perception is affected, the lower second maximum prevents the refresh rate from varying above a level at which the refresh rate can increase visual perception.

Though only a single refresh motion threshold is described in FIG. 5, methods in accordance with this disclosure may include a plurality of motion thresholds and/or the maximum refresh rate may vary continuously with the degree of combined motion. Furthermore, the method in FIG. 5 may be continuously run, run at intervals, or run upon demand.

Figure 6:
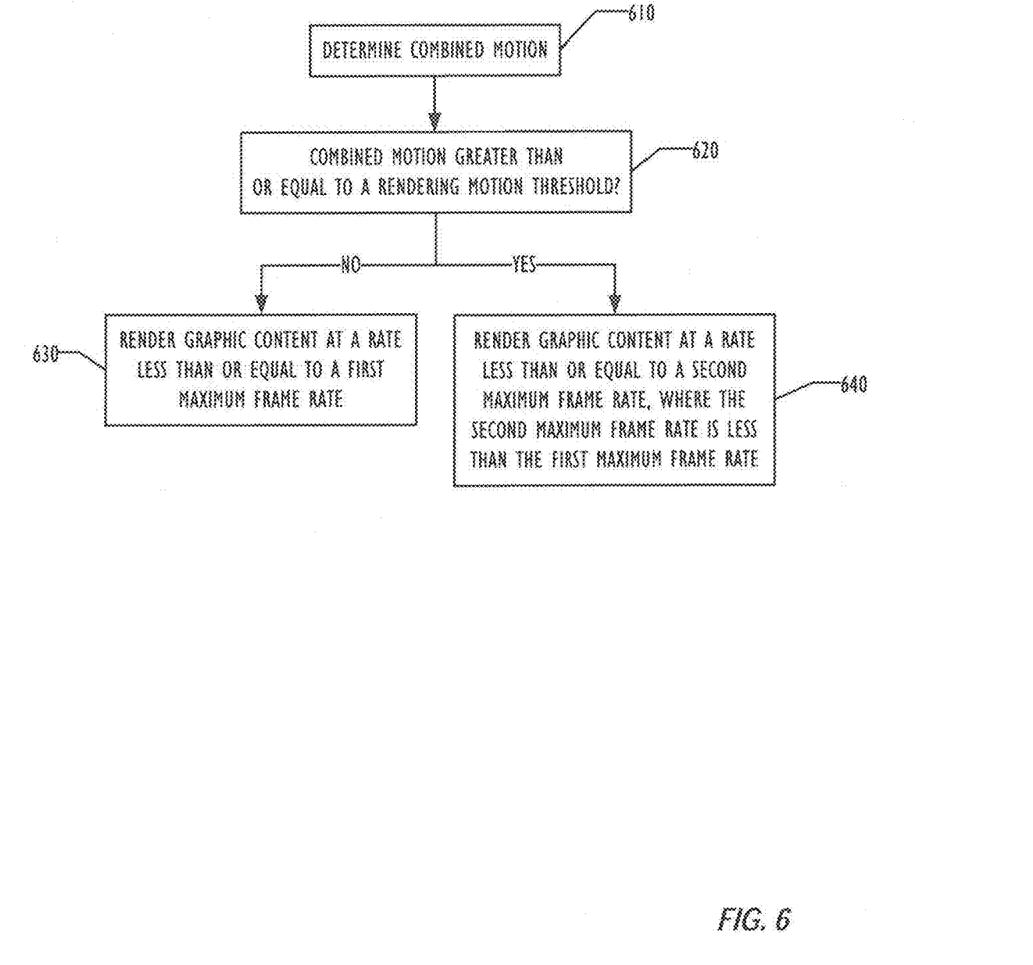
FIG. 6 is a flowchart illustrating a method for implementing a dynamic rate for rendering graphic content based on a combination of device motion and content motion, according to one embodiment.

FIG. 6 is a flowchart 600 illustrating a method for rendering graphics at a dynamic rendering rate based on device motion, according to one embodiment. Battery and processing power are essentially wasted when expended to render graphics that cannot be perceived by the viewer either due to high degrees of device motion or due to a reduced display refresh rate. By reducing the frame rate (a.k.a the rendering rate) in response to increased device motion, battery and processing power can be conserved without significantly impacting viewer perception.

In block 610, the combined motion is determined, according to one embodiment. In one embodiment, content motion and device motion are combined as described above with respect to block 230. In some embodiments, content motion may be either zero or excluded, such that only the sensed device motion is used.

In block 620, it is determined whether the combined motion is greater than a rendering motion threshold, according to one embodiment. The rendering motion threshold may be based on, for example, a perceptual model or informed by an associated refresh motion threshold and/or modeling motion threshold.

In block 630, if the combined motion is less than a rendering motion threshold, the graphics system will render new frames at a frame rate less than or equal to a first maximum frame rate. In one embodiment, the first maximum frame rate may be at or near the maximum frame rate of which the graphics system is capable. Because the device motion is below the rendering motion threshold, a viewer of the display can perceive a certain level of detail and smoothness of motion in animated or moving content. As such, the first maximum rendering rate enables a higher degree of visual perception. By setting a maximum rendering rate as opposed to a specific rendering rate, the rendering rate of the display may vary based on factors other than device motion (e.g., limits in processing capability, an updated graphics model), or based on instructions to the graphics system, such as those initiated by an application or the operating system.

In block 640, if the combined motion is greater than or equal to a rendering motion threshold, the graphics system will render new frames at a frame rate less than or equal to a second maximum frame rate. In one embodiment, the second maximum frame rate is less than the first maximum frame rate. Again, by setting a second maximum frame rate as opposed to a specific frame rate, the frame rate may be less than the maximum, as determined by other factors or instructions. However, because in block 620 the device motion is determined to be above a rendering motion threshold—where visual perception is affected and/or where the frame rate or modeling rate may already limit the manifestation of a higher frame rate—the lower second maximum frame rate prevents the frame rate from varying above a level at which the frame rate can increase visual perception.

Figure 7:
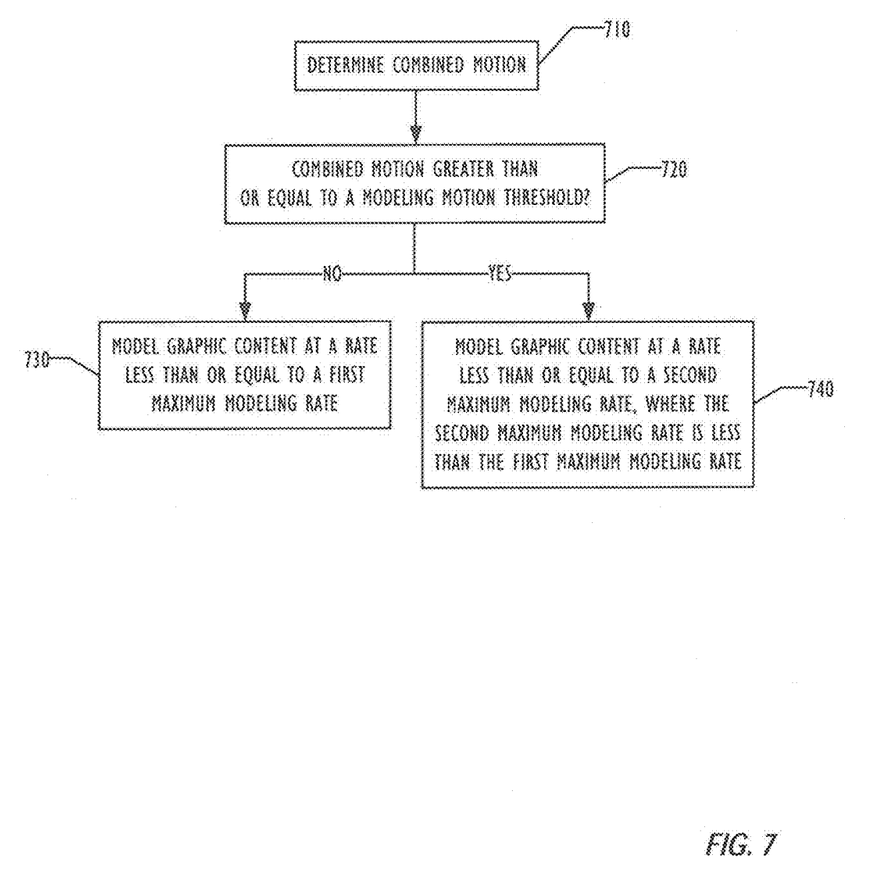
FIG. 7 is a flowchart illustrating a method for implementing a dynamic rate for modeling graphic content based on a combination of device motion and content motion, according to one embodiment.

FIG. 7 is a flowchart 700 illustrating a method for modeling graphics at a dynamic modeling rate based on device motion, according to one embodiment. Battery and processing power expended to update a graphic model are wasted in situations where changes in displayed content cannot be perceived by the viewer due to high degrees of device motion, or where a reduced frame rate and/or display refresh rate would create a bottleneck so that updates to the graphic model could not lead to updated displayed content. By reducing the modeling rate in response to increased device motion, battery and processing power can be conserved without significantly impacting viewer perception.

In block 710, the combined motion is determined, as discussed above with respect to refresh rate and frame rate, according to an embodiment. In one embodiment, the content motion is zero or not considered, so that only the device motion determines the modeling threshold. In block 720, it is determined whether the combined motion is greater than a modeling motion threshold, according to one embodiment. The modeling motion threshold may be based on, for example, a perceptual model or informed by an associated refresh motion threshold and/or rendering motion threshold.

In block 730, if the combined motion is less than a modeling motion threshold, the graphics system will generate a new graphics model or make changes to the existing model at a modeling rate less than or equal to a first maximum modeling rate. In one embodiment, the first maximum modeling rate may be at or near the maximum modeling rate of which the graphics system is capable. Because the device motion is below the modeling motion threshold, a viewer of the display can perceive a certain level of detail and smoothness of motion in animated or moving content. As such, the first maximum modeling rate, in combination with higher rendering and/or frame rates, enables a higher degree of visual perception.

In block 740, if the combined motion is greater than or equal to a modeling motion threshold, the graphics system will generate or update the graphic model at a modeling rate less than or equal to a second maximum modeling rate. In one embodiment, the second maximum modeling rate is less than the first maximum modeling rate. In one embodiment, when the combined motion equals or exceeds the modeling motion threshold, the graphics system does not update the model. For example, the modeling rate may drop to zero, and further renderings are based on the existing model.

In one embodiment, two or more of the modeling rate, the frame rate, and the refresh rate are reduced in response to detected increases in device motion. The individual rates may have shared motion thresholds or different motion thresholds. For example, above a modeling motion threshold, the graphics system may stop updating the model. However, the graphics system may continue to render new frames at this degree of motion, while the display continues to refresh at an initial refresh rate. In another embodiment, the frame rate and refresh rate may be synchronized, sharing motion thresholds. For example, the refresh rate may be an integer multiple of the frame rate.

Figure 8:
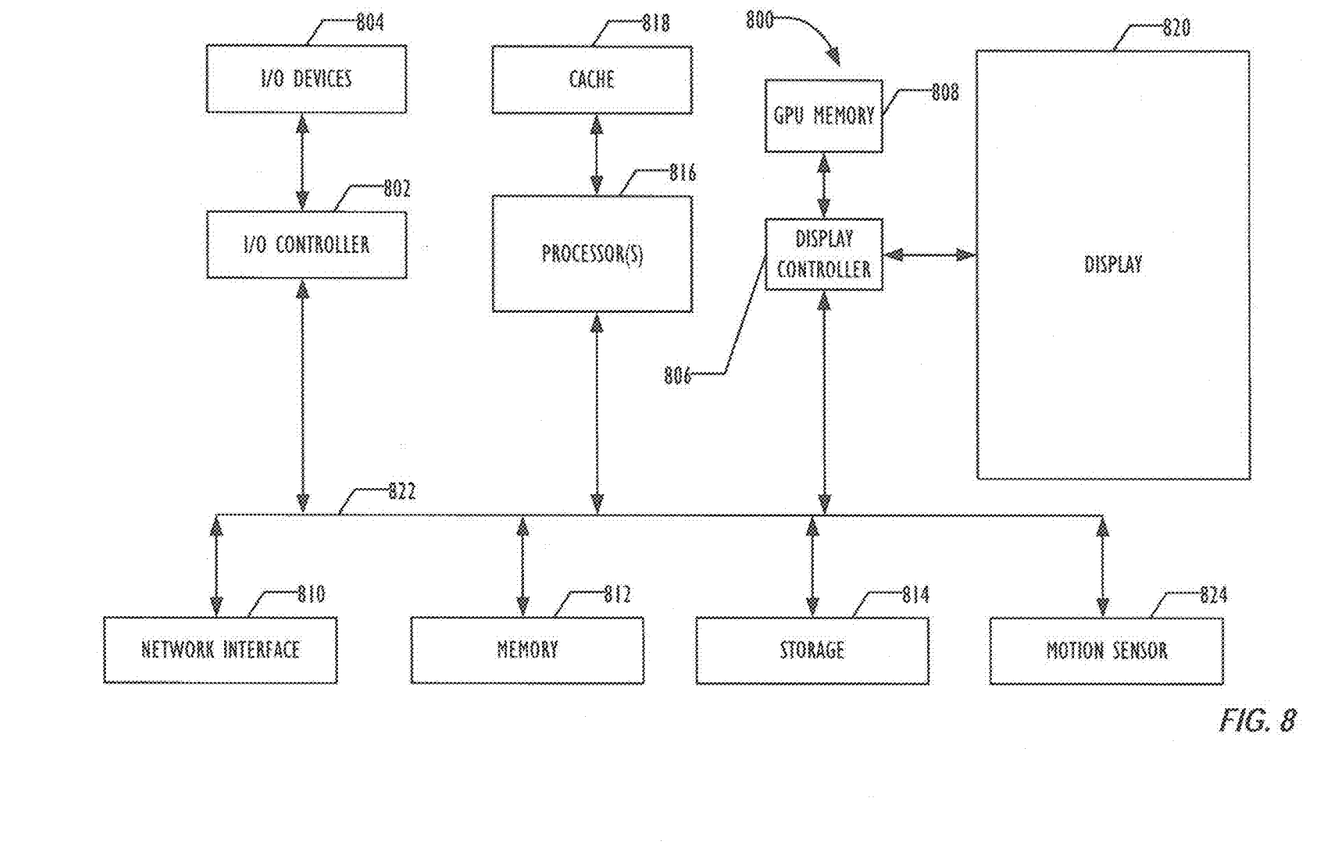
FIG. 8 illustrates a system having a display refreshed at a dynamic refresh rate based on device motion, according to one embodiment.

FIG. 8 shows one example of a computer system 800 that can be used in accordance with this disclosure. While FIG. 8 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) that have fewer components or perhaps more components may also be used to implement one or more embodiments as described herein.

As shown in FIG. 8, the computer system 800, which is a form of a data processing system, includes a bus 822 which is coupled to a microprocessor(s) 816, which may represent one or more CPUs and/or one or more GPUs, a memory 812, which may include one or both of a volatile read/write random access memory (RAM) and a read-only memory (ROM), and a non-volatile storage device 814. The processor(s) 816 may retrieve instructions from the memory 812 and the storage device 814 and execute the instructions using cache 818 to perform operations described above. The bus 822 interconnects these various components together and also interconnects these components 816, 818, 812, and 814 to a display controller 806 and display device 820, to peripheral devices such as input/output (I/O) devices 804 which may be mice, keyboards, modems, network interfaces, printers and other devices which are well known in the art, and to one or more motion sensors 824. In an embodiment, the display 820 is refreshed at a dynamic refresh rate based on the motion of device 800 as sensed by motion sensors 824. Typically, the input/output devices 804 are coupled to the system through input/output controllers 802. Where volatile RAM is included in memory 812, the RAM is typically implemented as dynamic RAM (DRAM) which requires power continually in order to refresh or maintain the data in the memory. The display controller 806 and display device 820 may optionally include one or more GPUs to process display data. Optionally, a GPU memory 808 may be provided to support GPUs included in the display controller 806 or display device 820.

The storage device 814 is typically a magnetic hard drive, an optical drive, a non-volatile solid-state memory device, or other types of memory systems which maintain data (e.g., large amounts of data) even after power is removed from the system. While FIG. 8 shows that the storage device 814 is a local device coupled directly to the rest of the components in the data processing system, embodiments may utilize a non-volatile memory which is remote from the system, such as a network storage device which is coupled to the data processing system through a network interface 810, which may be a wired or wireless networking interface. The bus 822 may include one or more buses connected to each other through various bridges, controllers and/or adapters as is well known in the art. Although only a single element of each type is illustrated in FIG. 8 for clarity, multiple elements of any or all of the various element types may be used as desired.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A computing device, comprising:
   a display device;
   one or more motion sensors configured to detect movement of the display device; and
   memory coupled to the display device and having instructions stored thereon to cause one or more processors to:
      display visual content on the display device at an initial visual rate, the initial visual rate based on a first combined motion value of the displayed visual content and movement of the display device as indicated by the one or more motion sensors;
      determine a motion direction and a degree of motion for one or more objects within the displayed visual content;
      determine a movement direction and a degree of movement of the display device based on output from the one or more motion sensors;
      generate a second combined motion value by adding the degree of motion and the degree of movement together based on a determination that the motion direction and the movement direction are along a same direction;
      determine, based on the second combined motion value, an updated visual rate that is greater than a rate of zero and less than the initial visual rate, wherein the second combined motion value is greater than the first combined motion value; and
      display the visual content on the display device at the updated visual rate.

2. The device of claim 1, wherein the initial visual rate includes an initial refresh rate that is associated with a non-moving state of the display device.

3. The device of claim 2, wherein the non-moving state corresponds to an initially measured motion of the display device that is less than a motion threshold.

4. The device of claim 1, wherein:
   the initial visual rate includes an initial frame rate;
   the updated visual rate includes an updated frame rate; and
   the memory comprises instructions to cause the one or more processors to:
      determine, based on the second combined motion value, the updated frame rate that is less than the initial frame rate for the display device; and
      render graphical content on the display device at the updated frame rate.

5. The device of claim 1, wherein:
   the initial visual rate includes an initial modeling rate that is indicative of a rate to update a graphic model that corresponds to the visual content;
   the updated visual rate includes a second modeling rate that is indicative of a second rate to update the graphic model, and
   the memory comprises instructions to cause the one or more processors to:
      determine, based on the second combined motion value, the second modeling rate that is less than the initial modeling rate for the display device; and
      model graphical content at the second modeling rate.

6. The device of claim 1, wherein the memory further comprises instructions to cause the one or more processors to:
   determine the second combined motion value by reducing the degree of movement by the degree of motion based on a determination that the motion direction and the movement direction are along opposite directions.

7. The device of claim 6, wherein the second combined motion value is less than both the degree of motion and the degree of movement based on the determination that the motion direction and the movement direction are along opposite directions.

8. The device of claim 6, wherein the second combined motion is less than the degree of movement but greater than the degree of motion based on a determination that the motion direction and the movement direction are moving in different directions.

9. The device of claim 1, wherein the first combined motion value is less than a second combined motion value of the displayed visual content and movement of the display device associated with the initial visual rate.

10. A method comprising:
    displaying visual content on a display of a portable device at an initial visual rate, wherein the portable device comprises one or more motion sensors;
    determining a motion direction and a degree of motion for one or more objects within the displayed visual content;
    determining a movement direction and a degree of movement of the portable device based on output from the one or more motion sensors;
    generating a combined motion value for the displayed visual content and movement of the portable device by adding the degree of motion and the degree of movement together based on a determination that the motion direction and the movement direction are along a same direction; and
    reducing the initial visual rate of the display to a first visual rate that is greater than a rate of zero in response to determining the combined motion value satisfies a first motion threshold.

11. The method of claim 10, further comprising generating the combined motion value by reducing the motion direction together with the degree of motion based on a determination that the motion direction and the movement direction are along opposite directions.

12. The method of claim 10, wherein the combined motion value is less than both the degree of motion and the degree of movement based on a determination that the motion direction and the movement direction are along opposite directions.

13. The method of claim 10, further comprising reducing the visual rate of the display to a second visual rate that is less than the first visual rate in response to the combined motion value being greater than the first motion threshold and a second motion threshold, wherein the second motion threshold is greater than the first motion threshold.

14. The method of claim 10, wherein determining the degree of motion comprises calculating the degree of motion based on information from a graphical rendering system.

15. A non-transitory computer program storage device comprising a non-transitory tangible computer readable storage medium that stores instructions that when executed cause at least one processor to:
    determine a motion direction and a degree of motion for one or more objects within visual content displayed at an initial visual rate on a display device;

determine a movement direction and a degree of movement of the display device based on output from one or more sensors;

generate a combined motion value for the displayed visual content and the movement of the display device by adding the degree of motion and the degree of movement together based on a determination that the motion direction and the movement direction are along a same direction;

determine, based on the combined motion value, a first reduced visual rate that is greater than a rate of zero and less than the initial visual rate for the display device; and reduce a display rate of the display device from the initial visual rate to the first reduced visual rate.

16. The non-transitory computer program storage device of claim 15, wherein the instructions when executed:

causes the at least one processor to determine the combined motion value by reducing the degree of movement with the degree of motion based on a determination that the motion direction and the movement direction are along opposite directions.

17. The non-transitory computer program storage device of claim 16, wherein the combined motion value is less than both the degree of motion and the degree of movement based on the determination that the motion direction and the movement direction are along opposite directions.

18. The non-transitory computer program storage device of claim 16, wherein the combined motion value is less than the degree of movement but greater than the degree of motion based on the determination that the motion direction and the movement direction are along the opposite directions.

19. The non-transitory computer program storage device of claim 15, wherein the instructions to determine the degree of motion within the visual content further comprise instructions to cause the at least one processor to receive a rate of motion within a visual content instruction from a graphics rendering system.

20. The non-transitory computer program storage device of claim 15, wherein the instructions to reduce the display rate further comprise instructions to cause the at least one processor to reduce the display rate from the first reduced visual rate to a second reduced visual rate when the output from the one or more sensors indicates a further increase in a rate of movement of the display device, and wherein the second reduced visual rate is lower than the first reduced visual rate.

* * * * *